United States Patent
Borran et al.

(10) Patent No.: US 7,088,784 B2
(45) Date of Patent: Aug. 8, 2006

(54) CODED MODULATION FOR PARTIALLY COHERENT SYSTEMS

(75) Inventors: Mohammad Jaber Borran, Irving, TX (US); Behnaam Aazhang, Houston, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/678,546

(22) Filed: Oct. 2, 2003

(65) Prior Publication Data
US 2005/0074068 A1 Apr. 7, 2005

(51) Int. Cl.
*H04L 5/12* (2006.01)
(52) U.S. Cl. ............ 375/264; 375/262; 375/346; 714/786; 714/798
(58) Field of Classification Search ............ 375/264, 375/261, 265, 346; 371/43; 358/12, 186; 714/786, 798
See application file for complete search history.

(56) References Cited

U.S. PATENT DOCUMENTS

| | | | | |
|---|---|---|---|---|
| 4,077,021 | A | 2/1978 | Csajka et al. ............ | 332/9 R |
| 4,891,823 | A | 1/1990 | Cole ......................... | 375/242 |
| 4,945,549 | A | 7/1990 | Simon et al. .............. | 375/53 |
| 5,267,021 | A | * 11/1993 | Ramchandran et al. ..... | 348/469 |
| 5,363,407 | A | * 11/1994 | Ramesh et al. ............ | 375/254 |
| 5,537,430 | A | * 7/1996 | Park et al. ................. | 714/792 |
| 5,822,371 | A | 10/1998 | Goldstein et al. .......... | 375/242 |
| 5,828,695 | A | 10/1998 | Webb ........................ | 375/219 |
| 6,081,555 | A | 6/2000 | Olafsson ................... | 375/242 |
| 6,097,764 | A | * 8/2000 | McCallister et al. ........ | 375/298 |
| 2001/0031019 | A1 | 10/2001 | Iafaxkhail et al. ......... | 375/267 |
| 2002/0131515 | A1 | 9/2002 | Rodriguez ................. | 375/262 |
| 2003/0076889 | A1 | 4/2003 | Walker et al. ............. | 375/261 |
| 2003/0123877 | A1 | 7/2003 | Lo ............................. | 398/34 |
| 2003/0126536 | A1 | 7/2003 | Gollamudi et al. ......... | 714/748 |
| 2003/0210824 | A1 | 11/2003 | Falzon et al. .............. | 382/240 |
| 2005/0094740 | A1 | 5/2005 | Borran et al. .............. | 374/267 |

OTHER PUBLICATIONS

"Elements of Information Theory" by T.M. Cover & J.A. Thomas, Wiley Interscience 1991, pp. 231 and 309-311.
"Channel Coding with Multilevel/Phase Signals", G. Ungerboeck, IEEE Trans. Info. Theory, vol. IT-28, (Abstract).

* cited by examiner

*Primary Examiner*—Dao Ha
*Assistant Examiner*—Jaison Joseph
(74) *Attorney, Agent, or Firm*—Harrington & Smith, LLP

(57) ABSTRACT

A signal constellation is optimized for trellis coded modulation in fast fading channels, where the receiver does not have perfect knowledge of the channel parameters. Specifically, the signal constellation is partitioned into $2^n$ mutually exclusive subsets, each preferably defining two points. Points within each subset are separated from one another by a distance between conditional distributions, preferably a Kullback-Leibler (KL) distance. For a block $m=k_1+k_2$ of information bits input into a trellis coder 30, the $k_1$ bits are trellis encoded into n bits ($n>k_1$) and used to select a subset of the constellation. The $k_2$ bit(s) is/are used to select a particular point within the subset. Because the inter-subset distance between points is a KL distance that is effectively greater than a Euclidean distance, error at the receiver is substantially reduced, especially at higher SNR. Using a KL distance ensures statistics of channel fading are inherent within the signal constellation.

23 Claims, 7 Drawing Sheets

CODED MODULATION FOR PARTIALLY COHERENT SYSTEMS

FIELD OF THE INVENTION

The present invention relates to signal constellations used in coded modulation for digital communication systems, especially wireless systems using trellis coded modulation and multiple transmit antennas.

BACKGROUND

Digital communications entail transmitting a bit sequence by modulating a carrier signal onto a carrier wave to assume discrete signal values, or constellation points. While increasing the number of available constellation points allows increased data rates over a given bandwidth, the increase necessarily increases error frequency at the decoder because adjacent constellation points are closer in proximity to one another as compared to a constellation with fewer points. Considering that the decoder uses a maximum likelihood or other probability algorithm to determine exactly which constellation point it has received, the increased error rate is inherent. Trellis coded modulation (TCM) is a coding technique wherein modulation and coding are combined in a manner that reduces error rate by restricting transitions between adjacent constellation points. TCM as referred to herein includes any system that combines a multilevel/phase modulation signaling set with a trellis-coding scheme, or any code system that uses memory (e.g., a convolutional code). A multilevel/phase modulation signaling set is represented by a constellation (other than binary) involving multiple amplitudes, multiple phases, or multiple combinations thereof. A planar example is shown at FIG. 1A, a 16-ary QAM signal constellation.

In an uncoded system, the minimum distance between adjacent constellation points is merely the Euclidean distance. A fundamental concept of TCM systems is that transitions between adjacent constellation points are not allowed. TCM systems allow transitions only between non-adjacent points, so that the minimum Euclidean distance between points in an allowed transition, termed the free Euclidean distance, is greater than the Euclidean distance between two nearest adjacent points. TCM systems can thus increase coding gain without increasing bandwidth, power, or error rate.

The prior art diagrams of FIGS. 1A–1D are instructive. A 16-ary QAM signal constellation 12 of FIG. 1A is divided into mutually exclusive subsets by a series of set partitions, preferably until each subset includes only two points. Assuming that adjacent points of FIG. 1A are separated by the distance d, a first set partition in FIG. 1B yields two subsets 14 and 16 wherein adjacent points are separated by a distance $\sqrt{2d^2}$. Transitions between the first subset 14 and the second subset 16 are not allowed, so the free Euclidean distance is increased with set partitioning as compared to the uncoded constellation of FIG. 1B. A second set partition is shown in FIG. 1C, wherein each of the subsets 14, 16 of FIG. 1B are divided into two mutually exclusive sets wherein the minimum free Euclidean distance between points is increased to 2d. A third set partition illustrated in FIG. 1D further divides the constellation points among eight subsets wherein the minimum free Euclidean distance between points is increased to $\sqrt{8d^2}$. Assuming d=1, partitioning into subsets with only two members each yields a free Euclidean distance of 2.828. It is this increase in distance between allowable transitions that enables TCM to increase coding gain (or reduce error rates) without increasing channel bandwidth or power.

Additionally, it is usually assumed that the receiver has perfect knowledge of the channel state for code and constellation design, especially for wireless systems. In a slowly fading channel, where the fading coefficients remain approximately constant for many symbol intervals, the transmitter can send training signals that allow the receiver to accurately estimate the fading coefficients. In this case, one can safely assume perfect channel state information at the receiver, and use codes and constellations that are designed with this assumption. This is termed a coherent communication system. In many practical scenarios, there are some errors in the channel estimates due to the finite length of the training sequence. To maintain a given data rate with errors in the channel estimates, shorter training sequences were required for more rapidly fading channels, resulting in even less reliable channel estimates. Having multiple transmit antennas compounds this problem by requiring longer training sequences for the same estimation performance. Therefore, the usual assumption of known channel parameters at the receiver in designing optimal codes/constellations is not always valid in practice. In the presence of channel estimation errors (partially coherent systems), codes and constellations that are designed using the statistics of the estimation error are more desirable than the ones designed for perfect channel state information at the receiver.

SUMMARY OF THE INVENTION

The present invention modifies TCM to increase the distance between allowable transitions as compared to the prior art described above, using a signal constellation that does not assume perfect channel state information at the receiver. As such, the present invention allows for increased coding gain as compared to prior art TCM systems for a given bandwidth and signal power, without increasing error rate. The present invention is particularly advantageous when employed in a MIMO system, though the advantages made possible by the use of this invention may also be realized in systems employing a single transmit and a single receive antenna.

The present invention may be embodied on or in a computer readable medium, such as a read only memory, a random access memory, SRAM, flash memory, and other variations. It may be electronically readable, optically readable, magnetically readable, or a combination thereof. The present invention is not herein limited to any particular type of medium or computer reading process.

The present invention concerns a signal constellation for use in digital communications. One way of modulating digital communications is trellis code modulation, and the present invention contemplates, in one embodiment, a method for encoding a plurality of bits. The method includes selecting one of at least two mutually exclusive subsets of a signal constellation and a point within that selected subset based on a plurality of bits, and modulating the selected point using a carrier waveform. In that manner, a symbol is conveyed in accordance with the selected constellation point. The selected subset includes at least two constellation points that are separated from one another by a distance based on a conditional distribution. As used herein, mutually exclusive subsets are subsets having no common constellation points.

In a preferred embodiment, this inter-subset distance is a Kullback-Leibler distance. Furthermore, the plurality of input bits preferably consist of $m=k_1+k_2$ bits, of which the $k_1$ bits are encoded into n bits that are used to select one of $2^n$ subsets, and the $k_2$ bits are used to select the point within the selected subset. The variables m, $k_1$ and $k_2$ are non-zero integers.

In accordance with another aspect of the present invention there is provided a transmitter for transmitting a series of input bits. The transmitter includes an encoder, a mapper, and a computer readable medium for storing at least one signal constellation. The encoder has an input for receiving a plurality of input bits. The mapper has an input coupled to an output of the encoder. The storage medium is coupled to the mapper, which selects a subset of the signal constellation and a point within the selected subset based on the plurality of input bits. The selected subset includes at least two constellation points that are separated from one another by a distance based on a conditional distribution. Preferably, the distance is a maximized minimum Kullback-Leibler distance.

BRIEF DESCRIPTION OF THE DRAWINGS

FIGS. 1A–1D is a prior art 16 point QAM signal constellation in various levels of partitioning, wherein FIG. 1A is an entire constellation and each of FIG. 1B–1D represent sequential partitioning of FIG. 1A into smaller and more numerous subsets.

DETAILED DESCRIPTION

Figure 1A:
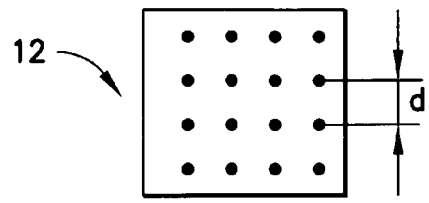
Figure 1B:
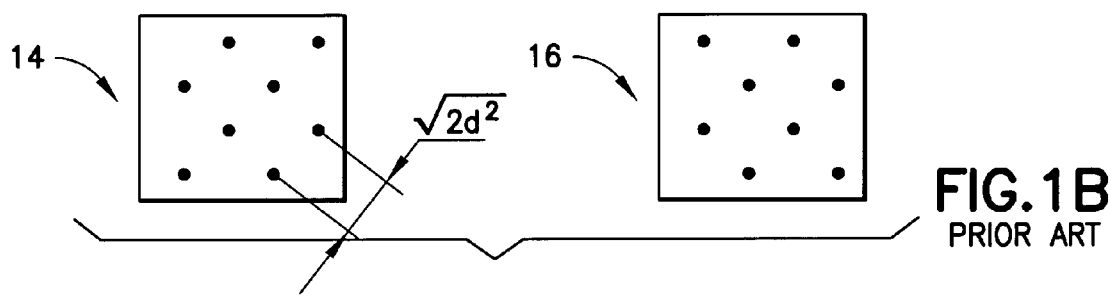
Figure 1C:
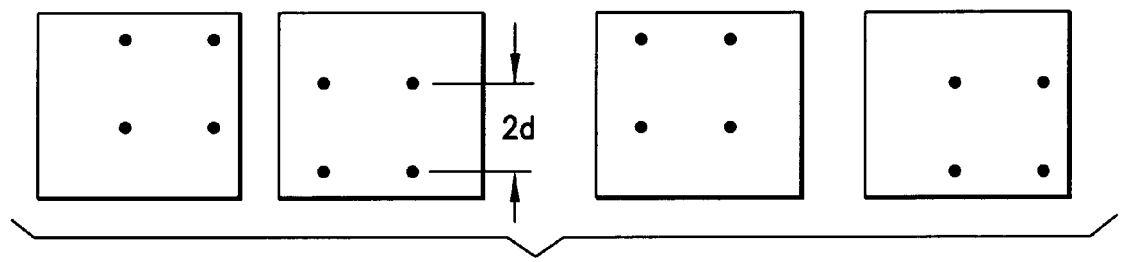
Figure 1D:
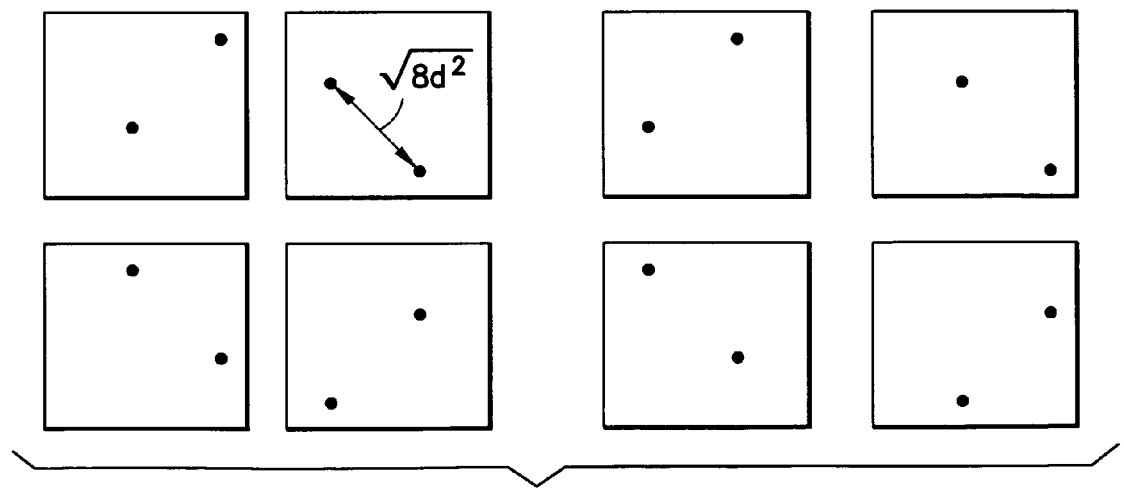

The present invention builds upon work detailed in International Patent Application PCT/IB03/02088, filed with the U.S. Receiving office on May 29, 2003 and entitled "METHOD AND APPARATUS TO ESTABLISH CONSTELLATIONS FOR IMPERFECT CHANNEL STATE INFORMATION AT A RECEIVER". That work described signal constellations wherein the individual constellation points were separated by a distance determined from conditional distributions, such as a Kullback-Leibler (KL) distance. This invention also builds on U.S. Patent Application No. 10/607,406, filed on Jun. 25, 2003 and entitled "SIGNAL CONSTELLATIONS FOR MULTI-CARRIER SYSTEMS", which details partially coherent signal constellations particularly adapted for multi-path communication systems. Both of the above related applications are herein incorporated by reference.

As used herein, a partially coherent system is a communication system in which the receiver does not have accurate knowledge of channel state information (CSI), and a partially coherent constellation is a signal constellation that assumes less than perfect knowledge of CSI at the receiver. A distance based on conditional distributions is a distance between points or entities wherein the position of at least one point is determined based on statistics of the point's likely position, such as a probability density. A location of one or both points may be determined by such a statistical measure and the distance between them is a distance based on conditional distributions. By assigning positions of signal constellation points by probability densities, statistics of channel fading are directly incorporated into the signal constellation. Conversely, assigning points based on strict Euclidean separation is an implicit assumption of perfect CSI at the receiver (a coherent system).

The preferred distance between conditional distributions for the purposes herein is known as a Kullback-Leibler (KL) distance, also sometimes referred to as relative entropy. In general, the KL distance $D(f\|g)$ between two densities f and g is defined by:

$$D(f\|g) = \int f \log \frac{f}{g}.$$

The distance $D(f\|g)$ is finite only if the support set of f is contained in the support set of g. For continuity, $$0 \log \frac{0}{0}$$

is set equal to zero. Many different types of distance functions between conditional distributions may be appropriate for designing signal constellations, such as a KL distance, a Chernoff distance, a J-divergence, a Bhattacharyya distance, and a Kolmogorov distance, to name a few.

As a summary of the above referenced applications, signal constellations for partially coherent systems may be optimized by separating the constellation points by a distance that is not Euclidean, but rather a distance between conditional distributions. Statistics of channel fading are used to encode additional information into the space-time matrix signal constellation as variations in amplitude of constellation points. A particularly advantageous measure of such a distance between conditional distributions is the Kullback-Leibler distance. Because the above works do not rely upon perfect channel state information at the receiver, errors introduced by that prior art assumption do not propagate throughout the communication system, so the more accurate signal constellations allow reduced error rates as compared to prior art constellations. The advantage is more pronounced in more complex channels and over multiple channels, such as systems using multiple transmit antennas. In practical systems, the partially coherent constellations described in the above applications are most advantageous when used with an appropriate outer code. The design criteria for the outer code in this case will be different from the existing Euclidean or Hamming distance based design criteria.

As detailed below mathematically, the inventors have discovered that the KL distance has an additive property, which is similar in some respects to the Euclidean distance in coherent systems and prior art constellations. The KL distance between the received distributions corresponding to two code words that span over several coherence intervals is the sum of the KL distances in those coherence intervals. This additive property is used in conjunction with mapping by set partitioning to design trellis coded modulation schemes for partially coherent systems in flat fading environments. Mapping by set partitioning is described below, and more particularly in association with trellis-coded modulation by G. Ungerboeck in "CHANNEL CODING WITH MULTILEVEL/PHASE SIGNALS", published in *IEEE Transactions on Information Theory*, vol. IT-28, January 1982, pp.55–67, herein incorporated by reference. Unlike the conventional TCM in which set partitioning is done based on the Euclidean distance, the partially coherent coded modulation of the present invention uses a set partitioning based on the KL distance. It is shown below that even with only a few percent channel estimation error, the coded modulation embodiments of the present invention achieve significant performance gains over the conventional constellations and trellis coded modulation schemes.

System Model:

Assume B blocks of data, each of length T symbol intervals (where T is the coherence interval of the channel). The B signal matrices of size T×M (where M is the number of transmit antennas) are stacked to form the transmitted matrix, S. Similarly, the received signals are collected in a T×BN matrix, X, where N is the number of receive antennas. With these assumptions, the received matrix can be expressed in terms of the transmitted matrix, channel matrix, and the additive noise, using the following expression:

$$X = SH + W,\qquad [1]$$

where $$S = [S^1 \cdots S^B],\qquad [2]$$

$$X = [X^1 \cdots X^B],\quad H = \begin{bmatrix} H^1 & \cdots & 0 \\ \vdots & \ddots & \vdots \\ 0 & \cdots & H^B \end{bmatrix},$$

$$W = [W^1 \cdots W^B],$$

and $$S^b = \begin{bmatrix} S^b_{11} & \cdots & S^b_{1M} \\ \vdots & \ddots & \vdots \\ S^b_{T1} & \cdots & S^b_{TM} \end{bmatrix},\quad X^b = \begin{bmatrix} X^b_{11} & \cdots & X^b_{1N} \\ \vdots & \ddots & \vdots \\ X^b_{T1} & \cdots & X^b_{TN} \end{bmatrix},\qquad [3]$$

$$H^b = \begin{bmatrix} H^b_{11} & \cdots & H^b_{1N} \\ \vdots & \ddots & \vdots \\ H^b_{M1} & \cdots & H^b_{MN} \end{bmatrix},\quad W^b = \begin{bmatrix} W^b_{11} & \cdots & W^b_{1N} \\ \vdots & \ddots & \vdots \\ W^b_{T1} & \cdots & W^b_{TN} \end{bmatrix},$$

for b =1, . . . , B. The entries of W are assumed to be independent circular complex Gaussian random variables from the distribution CN(0, 1). Also, with the block fading assumption on the channel with coherence interval of T, the non-zero entries of H are also independent circular complex Gaussian random variables from the distribution CN(0, 1). These independence assumptions yield:

$$p(X\mid S, H) = \prod_{b=1}^{B} p(X^b\mid S^b, H^b).\qquad [4]$$

Similarly defining the TM×TN block diagonal matrices of channel estimates, $\hat{H}$, and the estimation error, $\tilde{H}$, at the receiver, as $$\hat{H} = \begin{bmatrix} \hat{H}^1 & \cdots & 0 \\ \vdots & \ddots & \vdots \\ 0 & \cdots & \hat{H}^B \end{bmatrix},\quad \tilde{H} = \begin{bmatrix} \tilde{H}^1 & \cdots & 0 \\ \vdots & \ddots & \vdots \\ 0 & \cdots & \tilde{H}^B \end{bmatrix},\qquad [5]$$

$$\hat{H}^b = \begin{bmatrix} \hat{H}^b_{11} & \cdots & \hat{H}^b_{1N} \\ \vdots & \ddots & \vdots \\ \hat{H}^b_{M1} & \cdots & \hat{H}^b_{MN} \end{bmatrix},\quad \tilde{H}^b = \begin{bmatrix} \tilde{H}^b_{11} & \cdots & \tilde{H}^b_{1N} \\ \vdots & \ddots & \vdots \\ \tilde{H}^b_{M1} & \cdots & \tilde{H}^b_{MN} \end{bmatrix},\qquad [6]$$

for b=1, . . . , B, so that $H=\hat{H}+\tilde{H}$ yields $$X = S(\hat{H}+\tilde{H}) + W.\qquad [7]$$

Non-zero entries of $\hat{H}$ and $\tilde{H}$ are assumed to be independent zero-mean circular complex Gaussian random variables. An estimation variance of $\sigma_E^2$ per channel coefficient is also assumed, resulting in a $CN(0,\sigma_E^2)$ distribution for the non-zero entries of $\tilde{H}$ and a $CN(0, (1-\sigma_E^2))$ distribution for the entries of $\hat{H}$. By setting $\sigma_E^2$ equal to zero or one, this model reduces to the coherent and non-coherent system models, respectively.

Using the above distributions for the matrices $\hat{H}$ and $\tilde{H}$ yields:

$$p(X\mid S, \hat{H}) = E_{\tilde{H}}\{p(X\mid S, \hat{H}, \tilde{H})\}\qquad [8]$$

$$= \prod_{b=1}^{B} \frac{\exp\{-tr[(I_T + \sigma_E^2 S^b S^{bH})^{-1}(X^b - S^b\hat{H}^b)(X^b - S^b\hat{H}^b)^H]\}}{\pi^{TN}\det^N(I_T + \sigma_E^2 S^b S^{bH})}.\qquad [9]$$

The maximum likelihood (ML) decoder will find the signal matrix that maximizes the above expression for the given received matrix and channel estimate. Taking log from equation [9] and ignoring the common terms, the log-likelihood function is:

$$L(X\mid S, \hat{H}) = -\sum_{b=1}^{B} tr[I_T + \sigma_E^2 S^b S^{bH})^{-1}(X^b - S^b\hat{H}^b)(X^b - S^b\hat{H}^b)^H$$

$$-N\ln[\det(I_T + \sigma_E^2 S^b S^{bH})].\qquad [10]$$

Since each term in the sum depends on the transmitted matrix only in one coherence interval, the decoder can use a Viterbi algorithm.

Code Design Criteria:

According to Stein's lemma, the best achievable error exponent using a hypothesis test is given by the Kullback-Leibler (KL) distance between the distributions corresponding to the hypotheses. Though the best achievable error exponent is achieved by a detector that is highly biased in favor of one of the hypotheses rather than an ML detector, performance of the ML detector is also related to the KL distance between the distributions. Therefore, similar to the patent applications referenced above, the Kullback-Leibler (KL) distance is used as a performance criterion. Using equation [9] above and the fact that the KL distance between two product distributions is the sum of the KL distances between the individual distributions, the KL distance between the two conditional distributions $p_i(X)=p(X|S_i, \hat{H})$ and $p_j(X)=p(X|S_j, \hat{H})$ will be given by:

$$D(p_i \| p_j) = \sum_{b=1}^{B} D^b(\hat{H}^b), \quad [11]$$

where $$D^b(\hat{H}^b) = N tr\{(I_T + \sigma_E^2 S_i^b S_i^{bH})(I_T + \sigma_E^2 S_j^b S_j^{bH})^{-1}\} - NT - \quad [12]$$

$$N \ln \det\{(I_T + \sigma_E^2 S_i^b S_i^{bH})(I_T + \sigma_E^2 S_j^b S_j^{bH})^{-1}\} +$$

$$tr\{(I_T + \sigma_E^2 S_j^b S_j^{bH})^{-1}(S_i^b - S_j^b)\hat{H}^b \hat{H}^{bH}(S_i^b - S_j^b)^H\}.$$

(For simplicity of the notation, the signal matrices $S_i$ and $S_j$ are not included in the arguments of the function $D^b$.)

As evident from the above, these KL distances depend on $\hat{H}$, and cannot be directly used as a design metric. It is advantageous to find an expected KL distance to be able to derive the design criterion. According to Stein's lemma, asymptotically in N, the pairwise error probability of mistaking $S_j$ for $S_i$, of the best hypothesis test designed to maximize the exponential decay rate of this error probability will be approximately given by:

$$Pr_{best}(S_j \to S_i | \hat{H}) \approx \exp(-D(p_i \| p_j)) = \exp\left(-\sum_{b=1}^{B} D^b(\hat{H}^b)\right). \quad [13]$$

To obtain the expected KL distance, we find the expected value of equation [13] with respect to the distribution of $\hat{H}$, which is a product distribution:

$$p(\hat{H}) = p(\hat{H}^1, \ldots, \hat{H}^B) = \prod_{b=1}^{B} p(\hat{H}^b). \quad [14]$$

Therefore, $$Pr_{best}(S_j \to S_i) = E_H\{Pr_{best}(S_j \to S_i | \hat{H})\} \quad [15]$$

$$\approx E_H\left\{\exp\left(-\sum_{b=1}^{B} D^b(\hat{H}^b)\right)\right\} \quad [16]$$

$$= E_{H^1,\ldots,H^B}\left\{\prod_{b=1}^{B} \exp(-D^b(\hat{H}^b))\right\} \quad [17]$$

$$= \prod_{b=1}^{B} E_{H^b}\{\exp(-D^b(\hat{H}^b))\} \quad [18]$$

$$= \prod_{b=1}^{B} \exp(-\overline{D}^b(p_i \| p_j)) \quad [19]$$

$$= \exp\left(-\sum_{b=1}^{B} \overline{D}^b(p_i \| p_j)\right) \quad [20]$$

where $$\overline{D}^b(p_i \| p_j) = N tr\{(I_T + \sigma_E^2 S_i^b S_i^{bH})(I_T + \sigma_E^2 S_j^b S_j^{bH})^{-1}\} - NT - \quad [21]$$

$$N \ln \det\{(I_T + \sigma_E^2 S_i^b S_i^{bH})(I_T + \sigma_E^2 S_j^b S_j^{bH})^{-1}\} +$$

$$N \ln \det\{I_M + (1 - \sigma_E^2)(S_i^b - S_j^b)^H$$

$$(I_T + \sigma_E^2 S_j^b S_j^{bH})^{-1}(S_i^b - S_j^b)\}.$$

From equation [20] above, the expected KL distance is given by:

$$\overline{D}(p_i \| p_j) = \sum_{b=1}^{B} \overline{D}^b(p_i \| p_j). \quad [22]$$

The above shows that, like Euclidean geometry, KL distances are additive in block fading. The code design criterion, therefore, is to maximize the minimum of the sum KL distances (sum of the individual KL distances corresponding to different signal matrices in the code words). This is similar in some respects to the code design criterion in AWGN channels, where the design criterion is to maximize the minimum of the sum Euclidean distance. Techniques similar to those used in designing coded modulation schemes for the AWGN channel can be used to design good outer codes for non-coherent and partially coherent systems.

Partially Coherent Coded Modulation:

The additive property of the expected KL distance, shown above, is similar to the additive property of the Euclidean distance, which is used by Trellis Coded Modulation (TCM) schemes to design bandwidth efficient trellis codes for AWGN channels. Coded modulation considers the modulation as an integral part of the encoding to achieve an increase in the effective minimum Euclidean distance between pairs of code words. An important aspect of such a joint coding and modulation approach is using an effective mapping method, generally referred to as mapping by set partitioning.

In the method of mapping by set partitioning, the signal set is partitioned into several subsets of relatively large minimum intra-subset square Euclidean distance, while the minimum inter-subset distance is the same as the minimum distance of the original signal set. For example, a constellation of $L=2^{n+k_2}$ signal points may be partitioned into $2^n$ subsets, each subset containing $2^{k_2}$ points. Each block of $m=k_1+k_2$ information bits is also partitioned into two groups of $k_1$ and $k_2$ bits. The first group is encoded into n bits while the second group is left uncoded. Then, the n bits from the encoder are used to select one of the $2^n$ possible subsets, while the $k_2$ uncoded bits are used to select one of the $2^{k_2}$ points in the selected subset. In principle, block codes or convolutional codes can be used in the structure of coded modulation schemes. However, because of the simpler implementation of the soft-decision decoding of the convolutional codes and more generally trellis codes (due to the availability of the Viterbi algorithm), most of the coded modulation schemes use a trellis code as a subset encoder. In this case, the overall code (including encoded and uncoded bits) can be represented by a trellis with parallel transitions. These parallel transitions correspond to the same encoded input bits but different uncoded bits, so that the resulting outputs are from the same subset.

For a trellis coded modulation scheme, the minimum Euclidean distance between code words is equal to the minimum of the following two quantities:
   a) minimum intra-subset Euclidean distance (due to the parallel transitions), and
   b) the minimum distance in the trellis of the constituent code, usually referred to as the free Euclidean distance of the code.

The set partitioning is performed with the goal of maximizing the first quantity, whereas the trellis of the constituent code is designed to maximize the second quantity. With an appropriate set partitioning and trellis design, the overall minimum distance of the code will be large enough to overcome the loss from the constellation expansion (due to the redundancy in the code), and provide a significant coding gain.

Similar techniques have been developed for coded modulation in fast fading scenarios, when receiver is assumed to have perfect channel state information. See for example, D. Divsalar and M. K. Simon, "THE DESIGN OF TRELLIS CODED MPSK FOR FADING CHANNELS: PERFORMANCE CRITERIA", *IEEE Transactions on Communications*, vol. 36, no. 9, pp. 1004–1012, September 1988; and "THE DESIGN OF TRELLIS CODED MPSK FOR FADING CHANNELS: SET PARTITIONING FOR OPTIMUM CODE DESIGN", *IEEE Transactions on Communications*, vol. 36, no. 9, pp. 1013–1021, September 1988. The design criteria in these approaches are maximizing the symbol Hamming distance and the minimum product Euclidean distance between pairs of codewords. Therefore, the set partitioning and trellis design is performed to maximize the length of the shortest error event path and the product of the Euclidean distances along this path.

Figure 2:
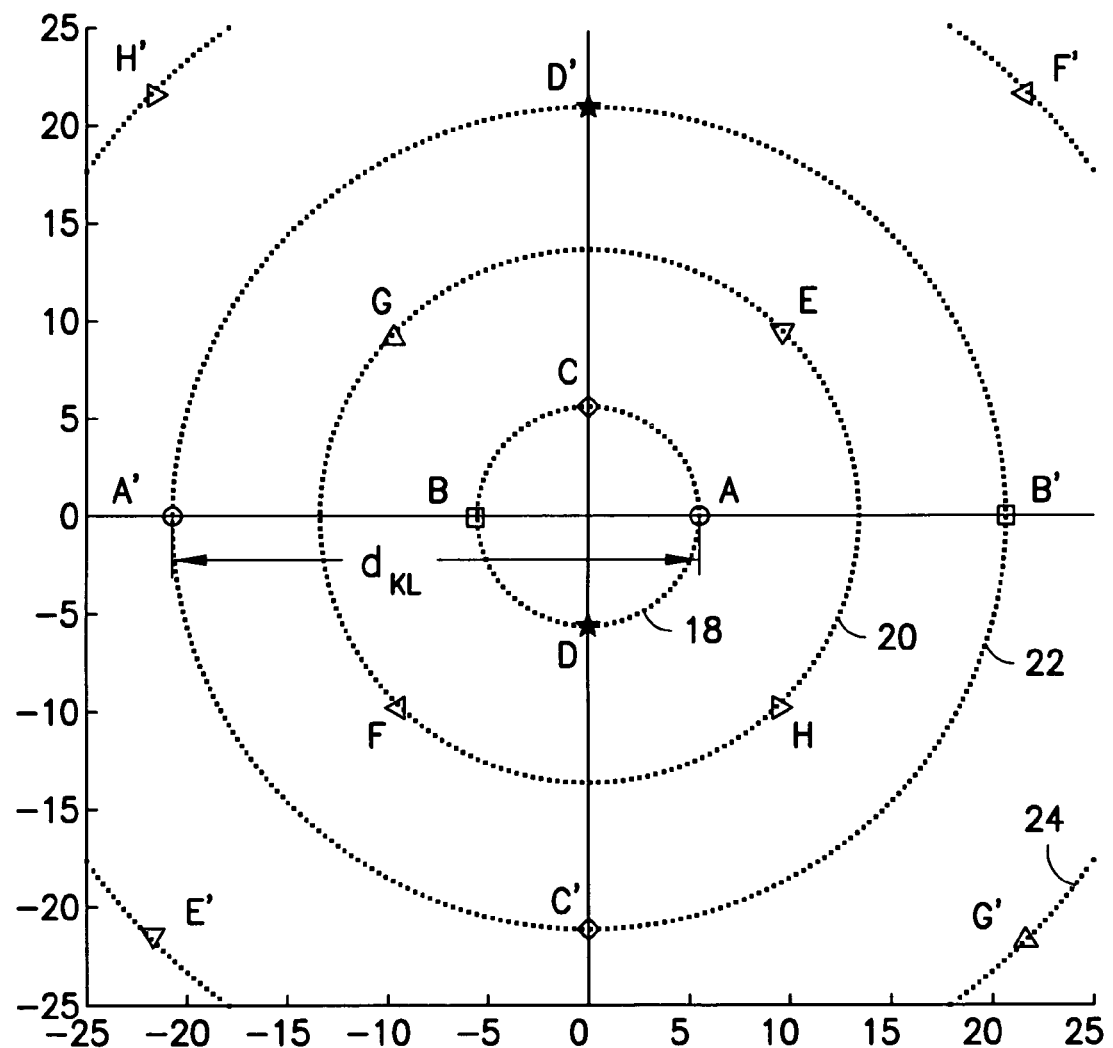
FIG. 2 is a diagram of a four level (four ring) signal constellation partitioned into eight subsets (A–A', B–B', etc.) each defining two points separated by a distance between conditional distributions, in accordance with the present invention.

The present invention extends the conventional trellis coded modulation in the AWGN channel to design good outer codes for partially coherent constellations. One main difference between the codes of this invention and the conventional TCM schemes is that the design criterion in this case is maximizing the minimum distance between conditional probabilities (preferably the KL distance) corresponding to the pairs of code words, as opposed to the Euclidean distance as in TCM. Therefore, the set partitioning and also the trellis design is based on the KL distance instead of the Euclidean distance between constellation points. FIG. 2 is an example to contrast against the prior art partitioning of the constellation described with reference to FIGS. 1A–1D. FIG. 2 is a four-level 16-point constellation designed for a channel estimation variance of 0.01 and a signal-to-noise ratio (SNR) of 20 dB per bit. The constellation of FIG. 2 defines four levels 18, 20, 22, 24, each level defining four points in a concentric ring (the ring for level 24 is only partially depicted). Rotations of the circular levels 18, 20, 22, 24 are allowed to obtain a larger minimum KL distance. The constellation is partitioned into eight subsets, each one containing two points (A and A', B and B', C and C', etc.), identified by complementary reference numbers and identical graphical markers. The partitioning is performed with the goal of maximizing the minimum KL distance between each pair of points within the same subset, the intra-subset KL distance. That distance is shown graphically in FIG. 2 as $d_{KL}$ between points A and A'. For an optimally designed constellation, the distance $d_{KL}$ is constant among all intra-subset points. While the distance $d_{KL}$ appears in FIG. 2 to be Euclidean, that is simply a limitation in illustrating constellation points in Euclidean space. At SNR of 20 dB per bit, the original minimum KL distance between adjacent points within the entire constellation is around 3.8971, whereas the minimum intra-subset distance in the partitioned constellation is 5.5361. Even though the increase in the minimum intra-subset KL distance from this partitioning is not as significant as the increase in the intra-subset Euclidean distance of the conventional TCM schemes (see the description of FIGS. 1A–1D above), simulation results show that partitioning according to maximizing a minimum intra-subset KL distance provides a substantial coding gain.

From each block of three information bits, two bits are encoded using a 16-state rate ⅔ convolutional code with octal transfer function of [1 4 2; 4 3 0], to produce three encoded bits. The three encoded bits are then used to select one of the eight subsets of the constellation, and the remaining uncoded bit is used to select one point from the selected subset.

Figure 3:
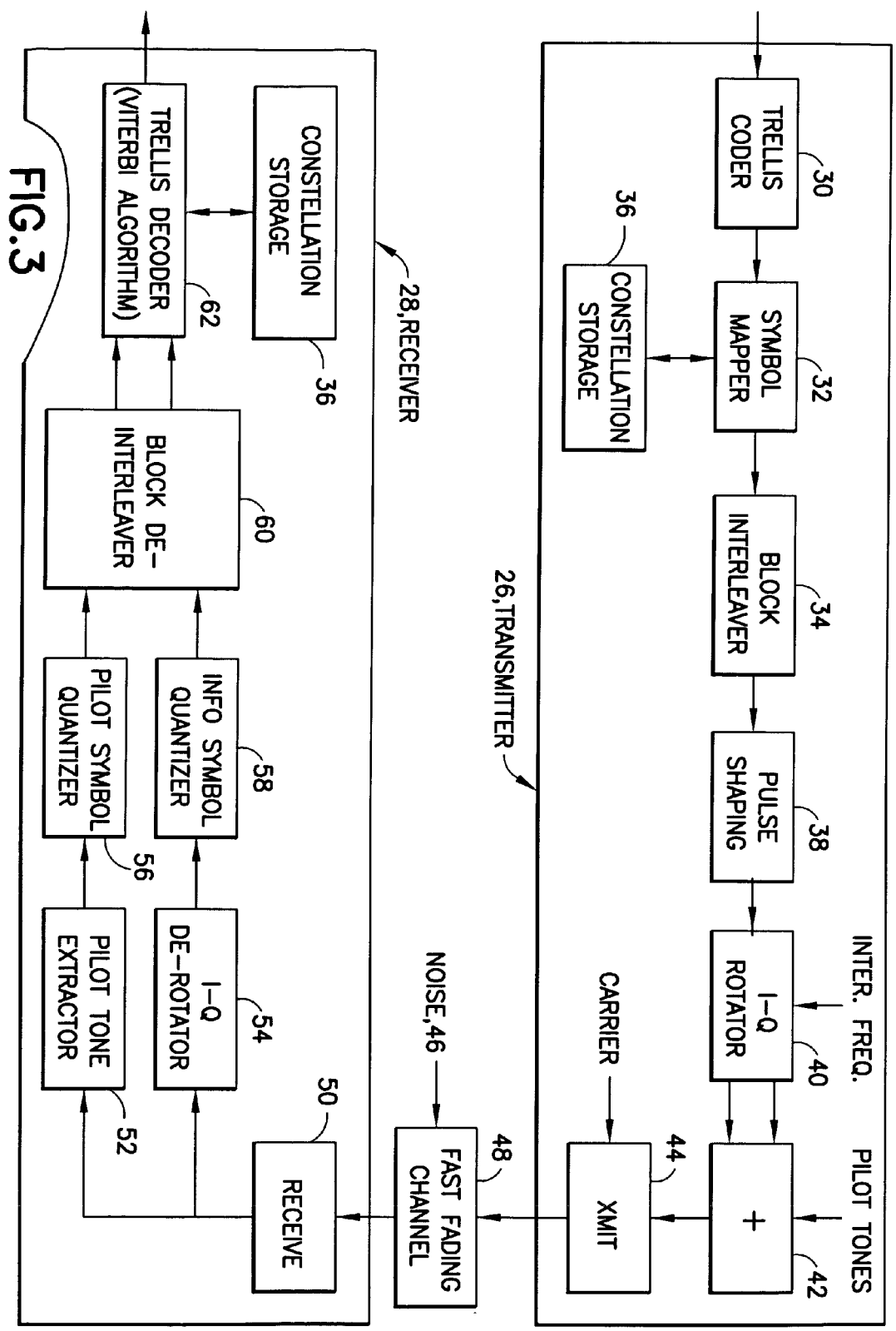
FIG. 3 is a block diagram of a transceiver that may employ a signal constellation according to the present invention.

FIG. 3 is a block diagram of a transceiver employing the present invention, presented for illustration purposes. The present invention may be embodied in a transmitter, a receiver, or a transceiver having substantially different circuitry from that shown. FIG. 3 includes a transmitter side 26 and a receiver side 28. A plurality of $m=k_1+k_2$ bits are input into a trellis coder 30 that maps the $k_1$ input into n encoded bits for a rate of $k_1/(k_1+1)$. The trellis coder 30 is typically implemented with a plurality of shift registers that enable the trellis coder 30 to incorporate a memory function respecting bits that were input previously, and a plurality of appropriate modulo-2 adders (XOR gates) disposed to enable only allowed transitions as generally depicted on a trellis diagram (see FIG. 5). The trellis coder 30 outputs the n encoded bits and the $k_2$ un-encoded bits to a symbol mapper 34, which correlates groups of bits to points of a space-time signal constellation stored in a memory 36 such as a electronic or optical read-only memory storing the constellation of FIG. 2. The mapped symbols are interleaved at a block interleaver 32 that breaks up burst errors extending longer than one symbol interval, and are then shaped at a pulse shaping filter 38, split into in-phase I and quadrature Q components, and upconverted to an intermediate frequency at a phase rotator 40. Pilot tones are added at an adder 42 to facilitate channel identification at the receiver side 28, and the combined signal from the adder 42 is upconverted to radio-frequency and transmitted 44 over a mobile wireless channel 48. Noise 46 is added to the signal over the channel 48, which is assumed to be fast-fading as the present invention is most advantageous in fast-fading channels where the receiver 28 does not know but rather must estimate the channel parameters.

The signal from the fast-fading channel 48 is received 50 and split into a pilot tone extractor 52 and a phase de-rotator 54. The respective symbols are quantized 56, 58 by a soft-decision process, de-interleaved 60, and a Viterbi algorithm is used at a trellis decoder 62 to correlate the de-interleaved symbols to various points of a signal constellation stored in memory 36 similar to that discussed above. Even where channel state information (CSI) is available, the fast-fading nature of the channel 48 ensures that the receiver 28 must make some estimate of channel parameters. For the purposes herein, fast-fading channel refers to a channel whose parameters vary as a function of time fast enough that the assumption of perfect channel state information at the receiver is invalid, that is, the assumption leads to unacceptable error.

Figure 4:
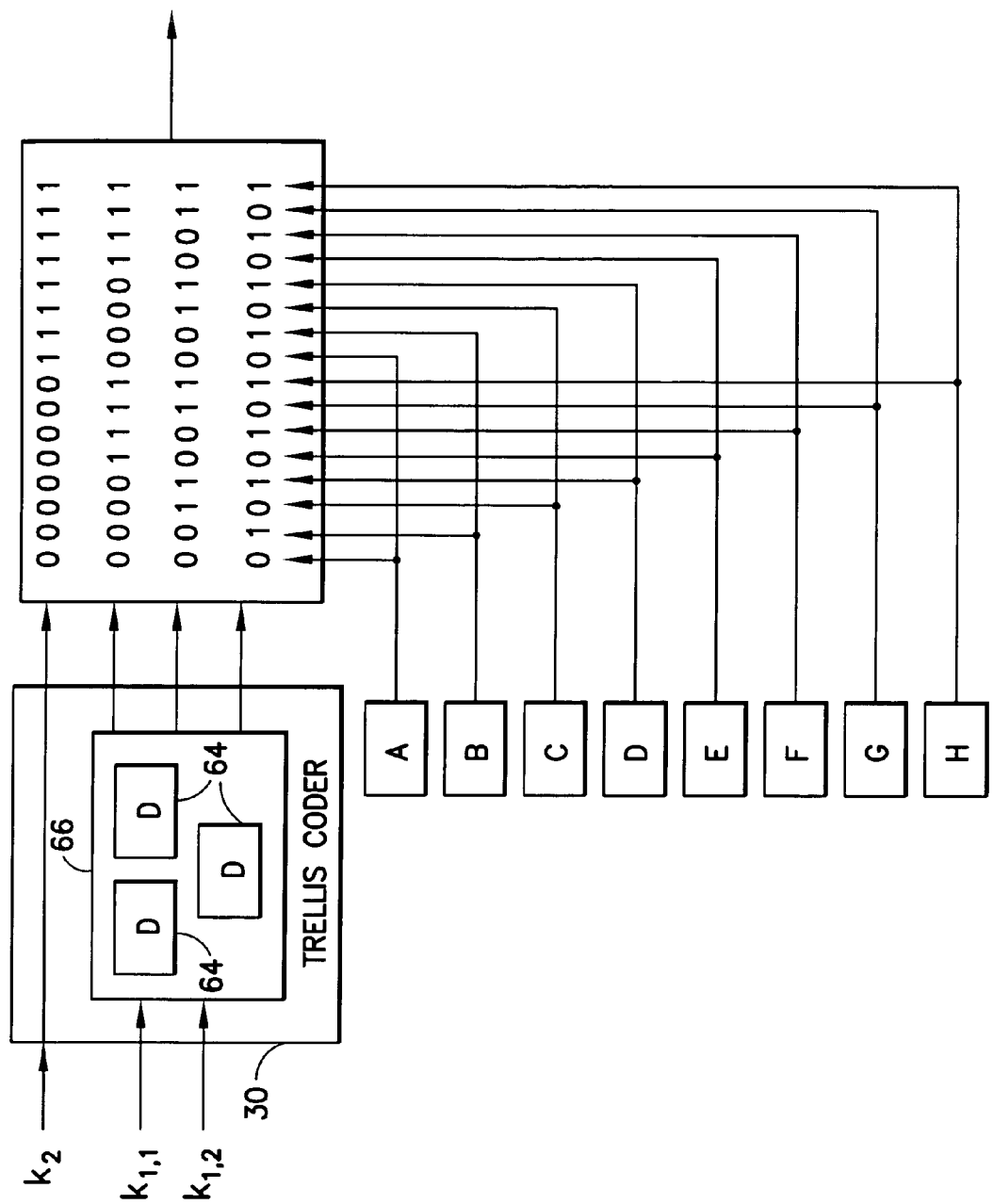
FIG. 4 is a block diagram of a trellis encoder that correlates a 3-bit input to a unique point of the signal constellation of FIG. 2.

A block diagram of a trellis coder 30 from FIG. 3 is shown in detail at FIG. 4. It is understood that trellis coders 30 may use shift registers 64 and modulo adders (not shown) within an encoding block 66 in various arrangements to allow or prevent certain transitions from one point of a signal constellation to another. FIG. 4 is therefore presented as an example only. A block of $m=k_1+k_2$ bits are input into the trellis coder 30. The $k_1$ bits are in this example are two bits, $k_{1,1}$ and $k_{1,2}$, which are input into the coding block 66 and are output as $n=k_1+1=3$ encoded bits. The $k_2$ bit in this embodiment passes through the trellis coder 30 unchanged. The n encoded bits uniquely select one of the $2^n$ unique and mutually exclusive subsets of the signal constellation. For example and referencing the signal constellation of FIG. 2, the diagram of FIG. 4 shows that n=0,0,0 selects subset A, and the $k_2$ bit selects either 0 or 1 within subset A; n=1,0,1 selects subset F and the $k_2$ bit selects either 0 or 1 within subset F. Each selection for n and $k_2$ is shown in FIG. 4 graphically.

In another embodiment, $k_2$ need not be only one bit but rather, for an input block of three bits, $k_2$ may represent two bits that pass through the trellis coder 30 unchanged. In this instance, the remaining $k_1$ bit is a single bit that passes through the encoding block 66 and is encoded into two encoded bits. The four bits, two encoded and two un-coded, uniquely select one point from a constellation of $2^{n+k_2}=16$ points. However, in this instance, each constellation subset defines four points rather than two, since the $k_1$ bits select the subset from $2^n=2^{k_1+1}=4$ mutually exclusive subsets, and the $k_2$ bits select one of $2^{k_2}=4$ points within that subset. Effective distance between constellation points is maximized, and error is therefore minimized, with only two points per subset, so preferably $k_2$ is a single bit.

Figure 5:
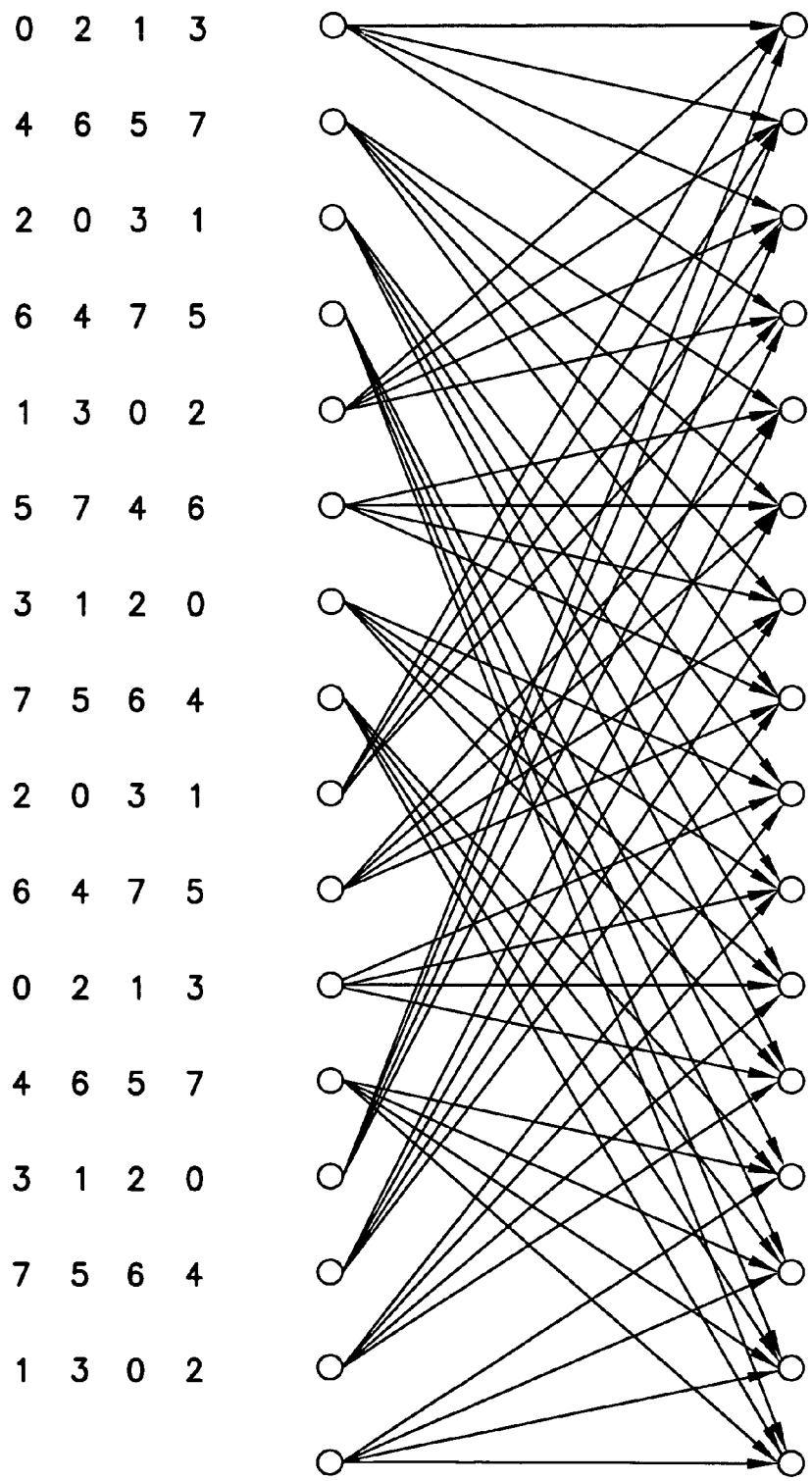
FIG. 5 is a trellis diagram for the signal constellation of FIG. 2.

FIG. 5 is a trellis diagram that depicts in a more readable format the allowed and disallowed state transitions for the example constellation of FIG. 2 and block diagram of FIG. 4. The numbers to the left are the various output symbols, each representing three output bits. Each group of four numbers at the left corresponds to the four allowed transitions from the associated state.

Figure 6B:
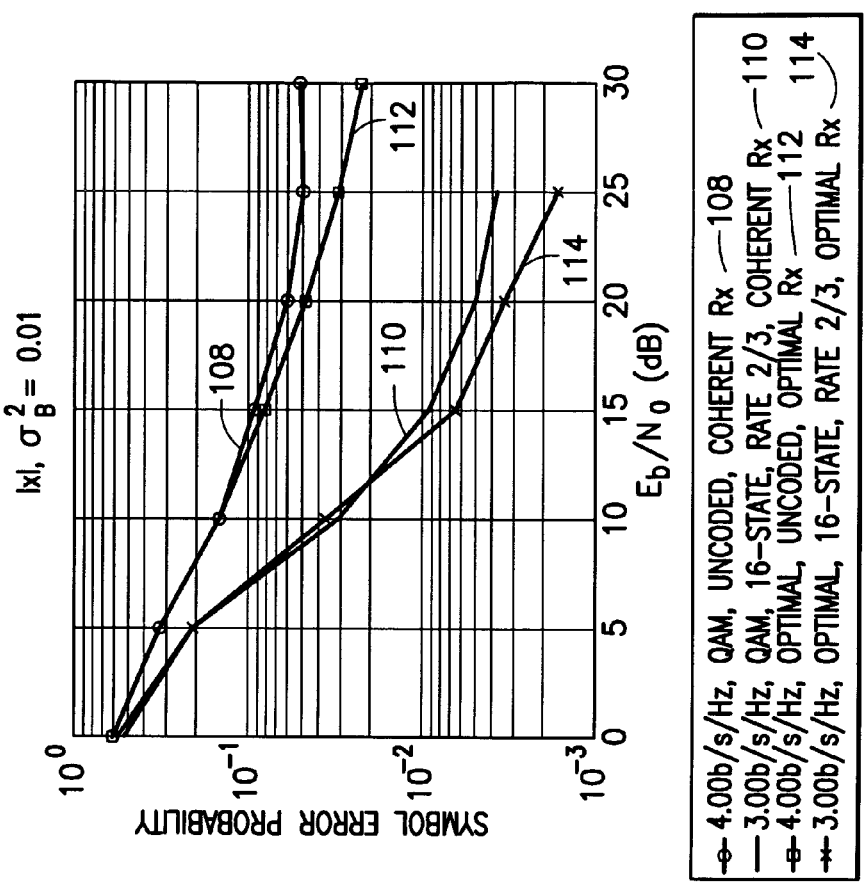
FIG. 6(b) is a graph similar to FIG. 6(a) but comparing the performances of the uncoded and trellis coded 16 QAM with the corresponding partially coherent constellations according to the present invention.
Figure 6A:
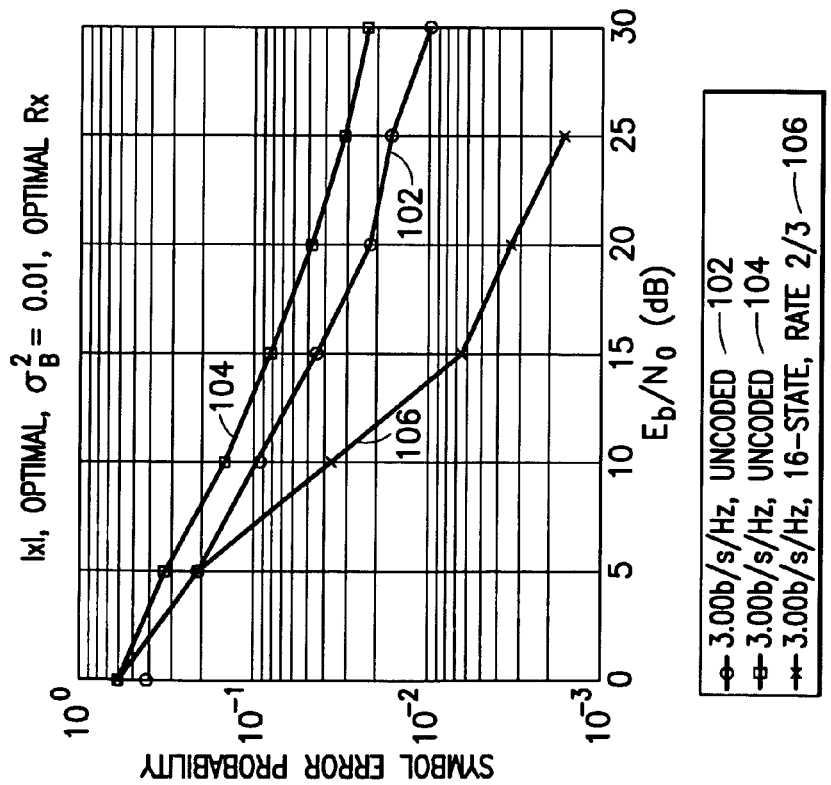
FIG. 6(a) is a graph comparing performances of the uncoded 8-point and 16-point partially coherent constellations with the 3 b/s/Hz trellis coded partially coherent modulation according to the present invention, for a channel estimation variance $\sigma_E^2=0.01$.

FIG. 6(a) compares the performances of the uncoded 8-point and 16-point partially coherent constellations with the 3 b/s/Hz trellis coded partially coherent modulation according to the present invention. The persistent gap between the performances of the uncoded 8-point (graph line 102) and 16-point (graph line 104) constellations is the loss due to the constellation expansion. The performance improvement due to the coding scheme of the present invention (graph line 106) overcomes this loss and also provides a substantial gain over the uncoded scheme with the same spectral efficiency.

FIG. 6(b) compares the performances of the uncoded and trellis coded 16 QAM with the corresponding partially coherent designs (labeled as optimal in the legend) at $\sigma_E^2=0.01$. The coded modulation scheme for the 16 QAM constellation (graph lines 108, 110) is designed with the assumption of perfect channel state information at the receiver, as discussed above in characterizing the prior art. The trellis coded partially coherent scheme (graph lines 112, 114) is designed based on the KL distance. As is evident, the partially coherent designs provide performance improvements in both coded (114 as compared to 110) and uncoded (112 as compared to 108) systems.

Figure 7B:
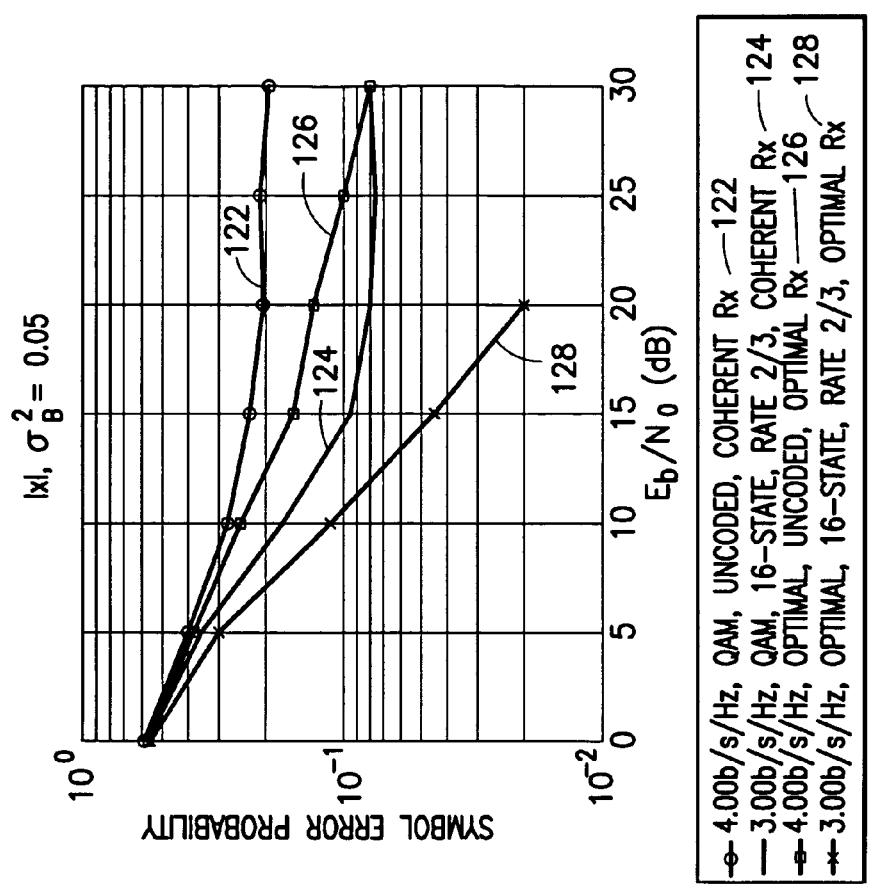
FIGS. 7(a)–(b) are graphs similar to FIGS. 6(a)–(b), respectively, but for a channel estimation variance $\sigma_E^2=0.05$.
Figure 7A:
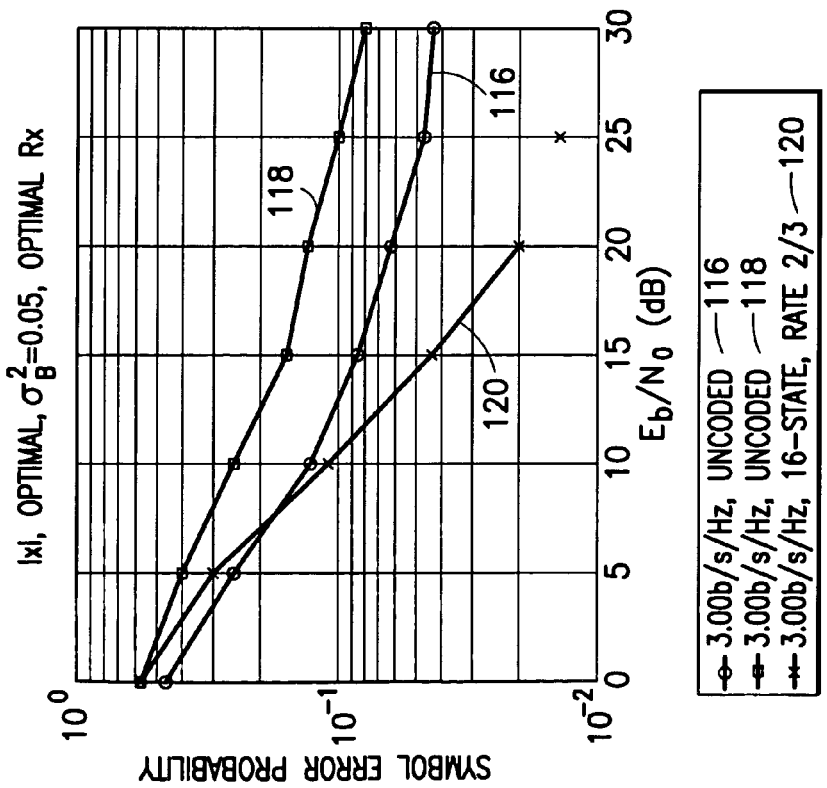

FIGS. 7(a)–(b) show results for the case when the channel estimation variance $\sigma_E^2=0.05$. The coding gain and performance comparisons with the conventional approaches are given in FIGS. 7(a) and (b). The performance improvement over the uncoded and trellis coded 16 QAM in the example of FIG. 7(a)–(b) case is even more significant than that in FIG. 6(a)–(b). In general, as the channel estimation variance increases, larger performance gains can be obtained by using the partially coherent designs.

While there has been illustrated and described what is at present considered to be a preferred embodiment of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A method for encoding a plurality of bits, comprising:
   based on a plurality of bits, selecting one of at least two mutually exclusive subsets of a signal constellation and a point within said selected subset;
   modulating the selected point using a carrier waveform; and
   transmitting the modulated point,
   wherein the selected subset includes at least two constellation points that are separated from one another by a distance based on a conditional distribution that is a function of a characteristic of a channel through which the modulated point is transmitted.

2. A method for encoding a plurality of bits, comprising:
   based on a plurality of bits, selecting one of at least two mutually exclusive subsets of a signal constellation and a point within said selected subset; and
   modulating the selected point using a carrier waveform,
   wherein the selected subset includes at least two constellation points that are separated from one another by one of a Kullback-Leibler distance and an expected Kullback-Leibler distance.

3. The method of claim 1, wherein selecting a subset of a signal constellation and a point within said selected subset comprises, based on a plurality $m=k_1+k_2$ of bits, using $k_1$ of the bits to select said subset and $k_2$ of the bits to select the point within said subset, wherein m, $k_1$ and $k_2$ are non-zero integers.

4. A method for encoding a plurality of bits, comprising:
   based on a plurality of bits, selecting, based on a plurality of $m=k_1+k_2$ of bits, using $k_1$ of the bits to select one of at least two mutually exclusive subsets of a signal constellation and using $k_2$ of the bits to select a point within said selected subset, wherein m, $k_1$, $k_2$, are non-zero integers; and
   modulating the selected point using a carrier waveform,
   wherein the selected subset includes at least two constellation points that are separated from one another by a distance based on a conditional distribution that is a function of a characteristic of a channel through which the modulated point is to be transmitted, and
   wherein using $k_1$ of the bits to select said subset comprises encoding the $k_1$ bits into encoded bits, and selecting one of $2^n$ mutually exclusive subsets with the n encoded bits, wherein n is greater than $k_1$.

5. The method of claim 4 wherein $k_2=1$ and $n=k_1+1$.

6. The method of claim 5 wherein n is selected from the set consisting of three, four and five, wherein the $k_1$ bits are encoded using a ⅔ convolutional code when n=3, the $k_1$ bits are encoded using a ¾ convolutional code when n=4, and the $k_1$ bits are encoded using a ⅘ convolutional code when n=5.

7. A method for encoding plurality of bits, comprising:
based on a plurality of bits, selecting one of at least two mutually exclusive subsets of a signal and a point within said selected subset;
modulating the selected point using a carrier waveform; and
transmitting the modulated point,
wherein the selected subset includes at least two constellation points that are separated from one another by a distance based on a conditional distribution that is a function of a characteristic of a channel which the modulated point is transmitted, and wherein the constellation points define concentric circles, and every point lying within a circle is from a different subset from every other point lying on that circle.

8. The method of claim 7 wherein every point on a circle is from a different subset from every other point lying on that circle and from every other point lying on an adjacent circle.

9. The method of claim 8 wherein n=3 and each subset defines two points.

10. The method of claim 1 further comprising transmitting the carrier, receiving the carrier over a fading channel, and decoding the symbol using a Viterbi algorithm.

11. A transmitter for transmitting a series of input bits comprising:
an encoder having an input for receiving a plurality of input bits;
a mapper having an output coupled to an output of the encoder;
a computer-readable medium storage coupled to the mapper for storing at least one signal constellation;
a modulator having an input coupled to an output of the mapper; and
a transmit antenna having an input coupled to an output of the modulator,
wherein the mapper selects a subset of said signal constellation and a point within the selected subset based on the plurality of input bits, said selected subset including at least two constellation points that are separated from one another by a distance based on a conditional distribution that is a function of a characteristic of a channel through which a signal from the transmit antenna is to be transmitted.

12. A transmitter for transmitting a series of input bits comprising:
an encoder having an input for receiving a plurality of input bits;
a mapper having an input coupled to an output of the encoder; and
a computer-readable storage medium coupled to the mapper for storing at least one signal constellation,
wherein the mapper selects a subset of said signal constellation and a point within the selected subset based on the plurality of input bits, said selected subset including at least two constellation points that are separated from one another by one of a Kullback-Leibler distance and an expected Kullback-Leibler distance.

13. The transmitter of claim 11, wherein the plurality of input bits comprises $m=k_1+k_2$ of bits, of which $k_1$ of the bits are used to select said subset and $k_2$ of the bits are used to select the point within said subset, wherein m, $k_1$ and $k_2$ are non-zero integers.

14. A transmitter for transmitting a series of input bits comprising:
an encoder having an input for receiving a plurality of input bits;
a mapper having an output coupled to an output of the encoder;
a computer-readable medium storage coupled to the mapper for storing at least one signal constellation;
a modulator having an input coupled to an output of the mapper; and
a transmit antenna having an input coupled to an output of the modulator,
wherein the mapper selects a subset of said signal constellation and a point within the selected subset based on the plurality of input bits, said selected subset including at least two constellation points that are separated from one another by a distance based on a conditional distribution that is a function of a characteristic of a channel through which a signal from the transmit antenna is to be transmitted, and wherein the encoder encodes $k_1$ of the bits into n encoded bits, and the mapper selects one of $2^n$ mutually exclusive subsets using the n encoded bits, wherein n is greater than $k_1$.

15. The transmitter of claim 14 wherein $k_2=1$ and $n=k_{1+1}$.

16. The transmitter of claim 15 wherein n is selected from the set consisting of three, four and five, wherein the $k_1$ bits are encoded using a ⅔ convolutional code when n=3, the $k_1$ bits are encoded using a ¾ convolutional code when n=4, and the $k_1$ bits are encoded using a ⅘ convolutional code when n=5.

17. A transmitter for transmitting a series of input bits comprising:
an encoder having an input for receiving a plurality of input bits;
a mapper having an output coupled to an output of the encoder;
a computer-readable medium storage coupled to the mapper for storing at least one signal constellation;
a modulator having an input coupled to an output of the mapper; and
a transmit antenna having an input coupled to an output of the modulator,
wherein the mapper selects a subset of said signal constellation and a point within the selected subset based on the plurality of input bits, said selected subset including at least two constellation points that are separated from one another by a distance based on a conditional distribution that is a function of a characteristic of a channel through which a signal from the transmit antenna is to be transmitted, and wherein the constellation points define concentric circles, and every point lying within a circle is from a different subset from every other point lying on that circle.

18. The transmitter of claim 17 wherein every point on a circle is from a different subset from every other point lying on that circle and from every other point lying on an adjacent circle.

19. The transmitter of claim 18 wherein n=3 and each subset defines two points.

20. The transmitter of claim 12 further comprising a receiver, said receiver said receiver using a Viterbi algorithm to decode a received symbol into a subset and a point within the subset according to the constellation.

21. A method for encoding plurality of $m=k_1+k_2$ bits comprising:
selecting a subset of a signal constellation based on the $k_1$ input bits;

selecting a point within the selected subset based on the $k_2$ input bits, wherein at least two points within the selected subset are spaced from one another by a distance based on a conditional distribution that is a function of a characteristic of a channel through which the selected point is to be transmitted and modulating the selected point using a carrier waveform, wherein m, $k_1$, and $k_2$, are non-zero integers, and at least one of $k_1$ and $k_2$ are greater than one.

22. A method for encoding plurality of $m=k_1+k_2$ bits comprising:

selecting a subset of a signal constellation based on the $k_1$ input bits;

selecting a point within the selected subset based on the $k_2$ input bits, wherein at least two points within the selected subset are spaced from one another by a distance based on a conditional distribution that is a function of a characteristic of a channel through which the selected point is to be transmitted and modulating the selected point using a carrier waveform, wherein m, $k_1$, and $k_2$, are non-zero integers, and at least one of $k_1$ and $k_2$ are greater than one, and wherein selecting a subset of a signal constellation based on the $k_1$ input bits comprises encoding the $k_1$ input bits into n encoded bits, and selecting one of $2^n$ subsets using the n encoded bits, wherein n is an integer greater than $k_1$ that is derived from $k_1$ bits and a previously input plurality of bits.

23. The method of claim 22, wherein each subset consists of two points and the signal constellation consists of $2^{m+1}$ points.

* * * * *